Nov. 19, 1940.  R. BAWDEN  2,222,558
TRACTOR LUG
Filed Feb. 8, 1940

Inventor
Richard Bawden
By Baldwin & Wight
his Attorney

Patented Nov. 19, 1940

2,222,558

UNITED STATES PATENT OFFICE 2,222,558

TRACTOR LUG

Richard Bawden, Plough Works, South Molton, England, assignor to Roadless Traction Limited, Hounslow, Middlesex, England Application February 8, 1940, Serial No. 317,985
In Great Britain January 17, 1939

4 Claims. (Cl. 301—44)

This invention relates to cleats or grips for the wheels of tractors and other vehicles required both for cross country and road work.

It is well known to fit the wheels of tractors with continuous rubber treads so that they may be driven on roads but the ground adhesion of such a wheel cannot be compared with that obtained from a wheel having metal spuds.

At the same time a wheel having metal spuds cannot comfortably be driven over roads or hard ground and it is the object of this invention to provide a wheel of improved construction and possessing the advantage of a rubber tread with ground adhesion equivalent to that afforded by metal cleats.

According to this invention there is attached to a wheel of the disc type a series of metal cleat members arranged in spaced relationship to one another so as to give the required ground adhesion and which members are hollow or otherwise recessed to receive a block or blocks of rubber or like resilient material, the block or blocks projecting sufficiently so as to operate as a rubber tread.

In practice, the cleats may consist of open ended box shaped members provided with lugs for attachment, conveniently by bolting, to a disc wheel. The cleats which preferably have an outwardly tapering section may be constructed to hold one or a pair of rubber blocks which are of such a size or are so mounted in the hollow of the box cleat as to project therefrom so as to provide a rubber tread. The rubber blocks may if necessary, be positioned by means of wood packing pieces arranged underneath the base of the rubber block.

Figure 1:
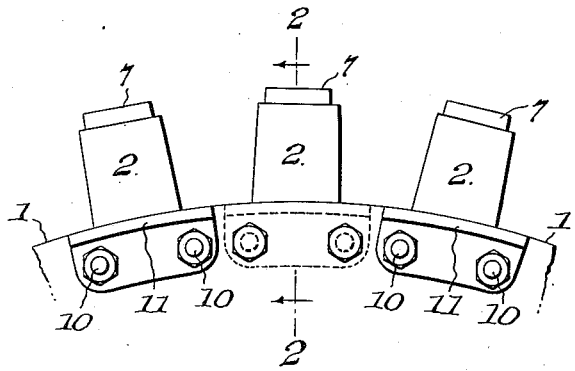
Figure 2:
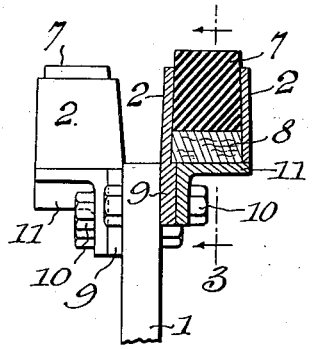
Figure 3:
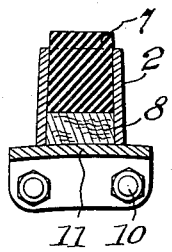

The invention is illustrated in the accompanying drawing in which Figure 1 is an elevation of a disc type tractor wheel having cleats according to this invention secured to it, Figure 2 is a section on the line 2—2 of Figure 1, and Figure 3 is a section on the line 3—3 of Figure 2.

Referring to the drawing, I indicates a tractor wheel of the disc type having secured to its periphery a plurality of metal cleats 2 each in the form of an open box having a radial lug 9 by which the cleat is bolted by bolts 10 to the face of the disc 1. The walls of the box 2 are slightly tapered so that the smaller cross sectional dimension of the box is directed outwards away from the centre of the disc 1. Into the taper of the box of each cleat 2 is inserted a rubber block 7 which is backed by a wood block 8 which in turn re-acts against one limb of an L-shaped piece 11 which closes the inner end of the box and the other limb of which is secured in place by the bolts 10. The block 8 operates thus to hold the outer end of the rubber block 7 slightly beyond the outer end of the box afforded by the cleat.

The various cleats 2 may be arranged in staggered relationship when attached to the wheel 1 and this could be effected by securing the lugs 9 of alternate cleats to opposite faces of the wheel 1 as is clearly indicated in Figure 2.

It will now be seen that the fitting to a tractor wheel 1 of cleats according to this invention enables the wheel to obtain good ground adhesion, the metal cleats functioning as spuds when running on soft ground and the parts of the rubber blocks 7 projecting beyond the cleats 2 providing a resilient tread when the wheel 1 is running on roads or hard ground.

When the blocks 7 become worn, new blocks can be inserted without difficulty or the wood block 8 underneath the rubber block 7 can be backed up as wear of the rubber takes place.

What I claim is:

1. A tractor wheel comprising a disc, a plurality of metal cleat members each in the form of an open ended metal box and the cleats having lugs, means so securing the cleat members in spaced relationship by their lugs to the face of the disc that the boxes project beyond the periphery of the disc, the walls of the boxes tapering to a minimum dimension remote from the centre of the disc, a block of rubber forced into the taper of each box and a seating block located in the box to hold the rubber block with its outer end projecting slightly beyond the outer end of the box.

2. A tractor wheel comprising a disc, a plurality of metal cleat members each in the form of an open ended metal box and the cleats having lugs, means so securing the cleat members in spaced relationship by their lugs to the face of the disc that the boxes project beyond the periphery of the disc, the walls of the boxes tapering to a minimum dimension remote from the centre of the disc, a block of rubber forced into the taper of each box, a member secured by the securing means and having a part closing the inner end of the box, and a seating block interposed between the said closing part and the inner end of the rubber block, said seating block holding the rubber block with its outer end projecting slightly beyond the outer end of the cleat.

3. A tractor wheel comprising a disc, a plurality of metal cleat members each in the form of an open ended metal box and the cleats having lugs, means so securing the cleat members in spaced relationship by their lugs to the face of the disc that the boxes project beyond the periphery of the disc, the walls of the boxes tapering to a minimum dimension remote from the centre of the disc, a block of rubber forced into the taper of each box, an L-shaped member one limb of which is secured to the disc by the securing means and the other limb of which closes the inner end of the box and a seating block interposed between the said other limb and the inner end of the rubber block, said seating block holding the rubber block with its outer end projecting slightly beyond the outer end of the cleat.

4. For use with a disc type of tractor wheel, a cleat member in the form of an open ended metal box having lug means to secure the cleat member to the face of the disc, the walls of the box tapering, a block of rubber forced into the taper, a member closing the other end of the box and a seating block interposed between the said closing member and the rubber block to hold the rubber block so that one end of the rubber block projects beyond the end of the box toward which the tapered walls converge.

RICHARD BAWDEN.